United States Patent
Retana et al.

(10) Patent No.: US 7,808,927 B2
(45) Date of Patent: Oct. 5, 2010

(54) TECHNIQUE TO AUTOMATICALLY DEAGGREGATE AN OPTIMUM SET TO PREVENT SUBOPTIMAL ROUTING OR ROUTING FAILURES WITHIN A LINK STATE FLOODING DOMAIN

(75) Inventors: Alvaro E. Retana, Raleigh, NC (US); Timothy M. Gage, Durham, NC (US); Russell White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 233 days.

(21) Appl. No.: 12/026,158

(22) Filed: Feb. 5, 2008

(65) Prior Publication Data

US 2009/0196181 A1 Aug. 6, 2009

(51) Int. Cl.
H04L 12/28 (2006.01)
H04L 12/56 (2006.01)
(52) U.S. Cl. ......................... 370/254; 370/392; 370/401
(58) Field of Classification Search ........................ None
See application file for complete search history.

(56) References Cited

U.S. PATENT DOCUMENTS

2002/0085498 A1* 7/2002 Nakamichi et al. .......... 370/236
2007/0025346 A1* 2/2007 Kecskemeti ................. 370/389
2008/0107043 A1* 5/2008 Smith et al. ................. 370/255
2008/0144644 A1* 6/2008 Allan et al. ................. 370/401
2008/0263353 A1* 10/2008 Droms et al. ............... 713/153

OTHER PUBLICATIONS

Cisco Systems, Inc., Tech Notes: What Are OSPF Areas and Virtual Links?, Document ID 13703, updated Aug. 10, 2005, 6 pages, copyright Cisco Systems, Inc. 1992-2005, available on the Internet at: <http://www.cisco.com/warp/public/104/8.pdf>.

Cisco Systems, Inc., Understanding Route Aggregation in BGP, Document ID 5441, updated Aug. 10, 2005, 9 pages, copyright Cisco Systems, Inc. 2006-2007, available on the Internet at: <http://www.cisco.com/warp/public/459/aggregation.pdf>.

* cited by examiner

*Primary Examiner*—Pankaj Kumar
*Assistant Examiner*—Marcus R Smith
(74) *Attorney, Agent, or Firm*—Charles E. Krueger

(57) ABSTRACT

In one embodiment, information is signaled between aggregating routers indicating the components of aggregated addresses. This information is used to dynamically leak, or deaggregate, specific parts of the aggregated address space to reduce sub-optimal routing and possibly prevent routing black holes from occurring in a network.

9 Claims, 4 Drawing Sheets

| ROUTER A | ROUTER B | ROUTER D |
|---|---|---|
| 10.0.0.0/8 A:D | 10.2.1.1/24 B:C | 10.1.1.0/24 D:E |
|  | 10.2.1.2/24 B:C | 10.1.2.0/24 D:E |

ROUTER A 10.0.0.0/8 A:D 10.2.1.1/24 A:B 10.2.1.2/24 A:B

TECHNIQUE TO AUTOMATICALLY DEAGGREGATE AN OPTIMUM SET TO PREVENT SUBOPTIMAL ROUTING OR ROUTING FAILURES WITHIN A LINK STATE FLOODING DOMAIN

BACKGROUND OF THE INVENTION

The Open Shortest Path First (OSPF) routing protocol is an interior gateway protocol for routing in Internet Protocol (IP).

A domain using OSPF may be sub-divided into areas. An area is a logical grouping of OSPF routers and links that effectively divides an OSPF domain into sub-domains. Routers in an area maintain an identical link state data base, and flooding of link state advertisements (LSAs) is limited to an area thereby reducing the OSPF protocol's impact on CPU and memory and making possible the construction of hierarchical network topologies. Areas are identified by an area ID and a special area called the backbone has an area ID equal to zero. The backbone is connected to all other areas as a hub is connected to its spokes and all areas must communicate with each other across the backbone.

An internal router is a router having all interfaces belonging to the same area. An area border router (ABR) connects one or more areas to the backbone and acts as a gateway for inter-area traffic.

Each ABR may summarize or aggregate a number of sub-net or network address components into a single aggregate address which is inserted into the backbone using a summary LSA. For example, a number of contiguous component addresses in a first area can be summarized by a first ABR into a first aggregate address having a smaller address mask or prefix than the component addresses. Other ABRs will use the first aggregate address in their route tables to direct packets having destination addresses that match the aggregate address to the first ABR. The first ABR will match the destination address of each packet to the appropriate component address of the aggregate address using the larger sub-net address mask.

This address aggregation is a crucial requirement for scaling OSPF to large domains, as it results in significant reductions in routing table size, smaller link state data bases, and less network traffic to synchronize the router link-state data bases. On the other hand, address aggregation also implies loss of information about optimal paths to specific destinations, which can generally result in suboptimal routing.

TECHNICAL FIELD

The present disclosure relates generally to sharing information held in aggregating routers to prevent sub-optimal routing or black holes in the event of a link failure.

DESCRIPTION OF EXAMPLE EMBODIMENTS

Overview

In a network having first and second aggregating routers, a first group of component addresses is hashed at the first aggregating router to form a first hash signature, where the first group of component addresses has been summarized at the first aggregating router as a first aggregate address. The first aggregate address and first hash signature are inserted into a link state packet and advertised to the second aggregating router over a virtual link.

A received second hash signature based on a second group of address components is compared to the first hash signature, where the second group of components has been summarized by the second aggregating router as the first aggregate address. A list of the first group of component addresses is advertised to the network if the first and second hash signatures do not match.

Description

Reference will now be made in detail to various example embodiments. These example embodiments are illustrated in the accompanying drawings. In the following description, numerous specific details are set forth in order to provide a thorough understanding of the various embodiments.

In some networks that use route aggregation a single link failure can cause either sub-optimal routing or a routing black hole, depending on the redundancy built into the network and the point of route aggregation.

Figure 1:
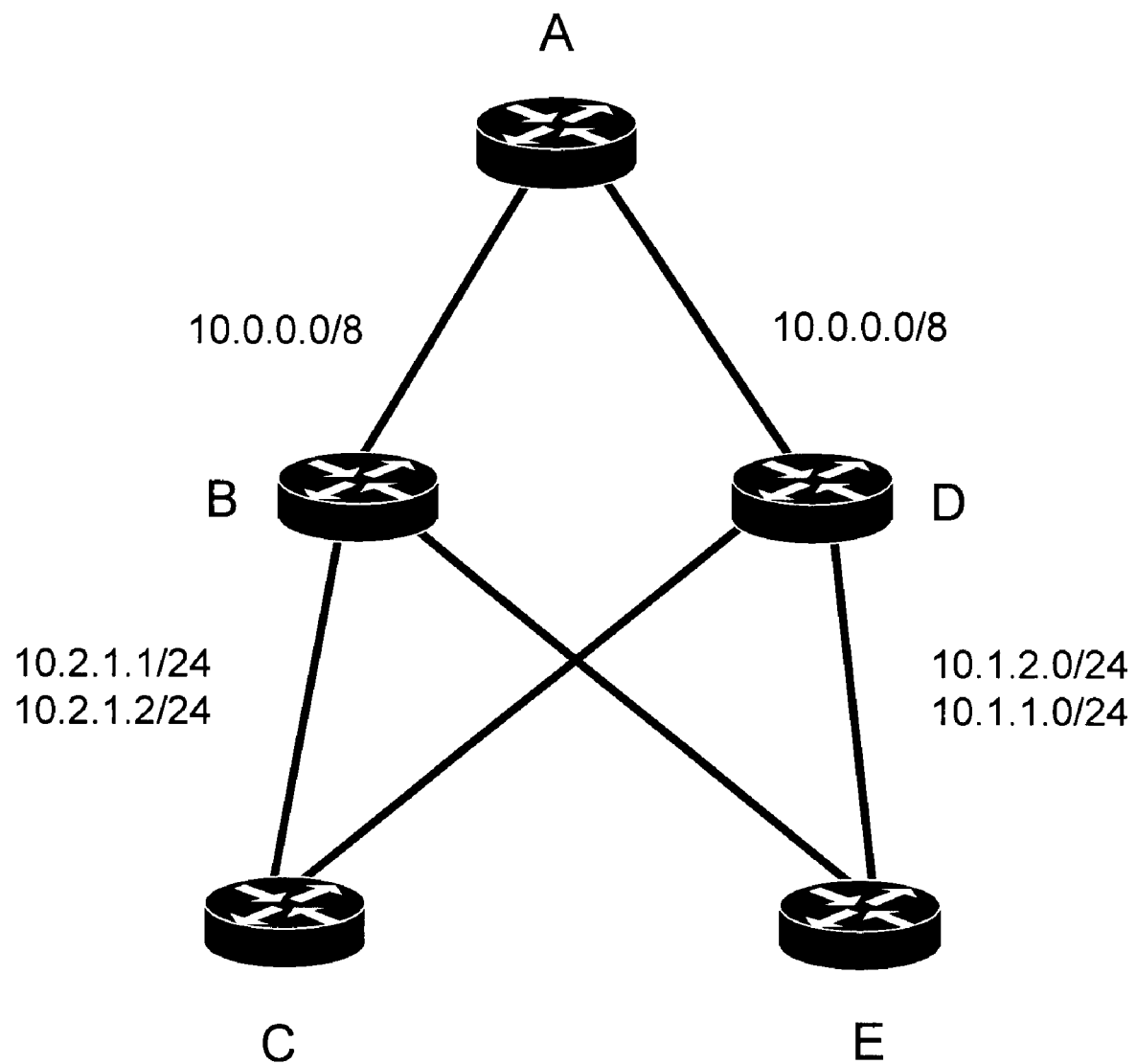
FIG. 1 illustrates an example of a network having aggregating routers.

An example of this type of behavior will now be described with reference to the simple network depicted in FIG. 1. In FIG. 1, Routers C and E each have two connections, a first connection to Router B and a second connection to Router D. In this example, Routers B and D are aggregating routes advertised by Routers C and E.

An aggregated address summarizes a number of component addresses having longer prefixes. These aggregate addresses are broadcast to the other routers in the network. When a packet arrives at a router its destination is matched to addresses in the route table using the longest prefix rule, i.e., it is matched to the entry with highest subnet mask. Thus, if the route table contains only an aggregate address, the router will forward the packet to the router that advertised the aggregate address. The aggregating router will match the packet destination address to the address components of the aggregated address to direct the packet to the proper destination.

Additionally, Routers C and E may be removing routing information they transmit to Routers B and D to improve protocol efficiency and optimize routes. In this case, route tables of Routers B and D may not have complete information about all possible routes between the different routers in the network.

If the link between Routers D and C fails, then any traffic that Router A transmits to Router C via Router D will either: 1) route sub-optimally or 2) be dropped at D (black hole).

For example, if the link between Router C and Router D is down and full routing information is being transmitted throughout the routing domain then any traffic Router A transmits to Router C via Router D will take the sub-optimal path A→D→E→B→C. Clearly, in this case the optimal path is A→B→C.

However, if Router D has no route information relating to reaching Router C via the link between Router D and Router E, because router C removed this information to improve protocol efficiency, then the packet transmitted by A would be dropped.

Figure 2:
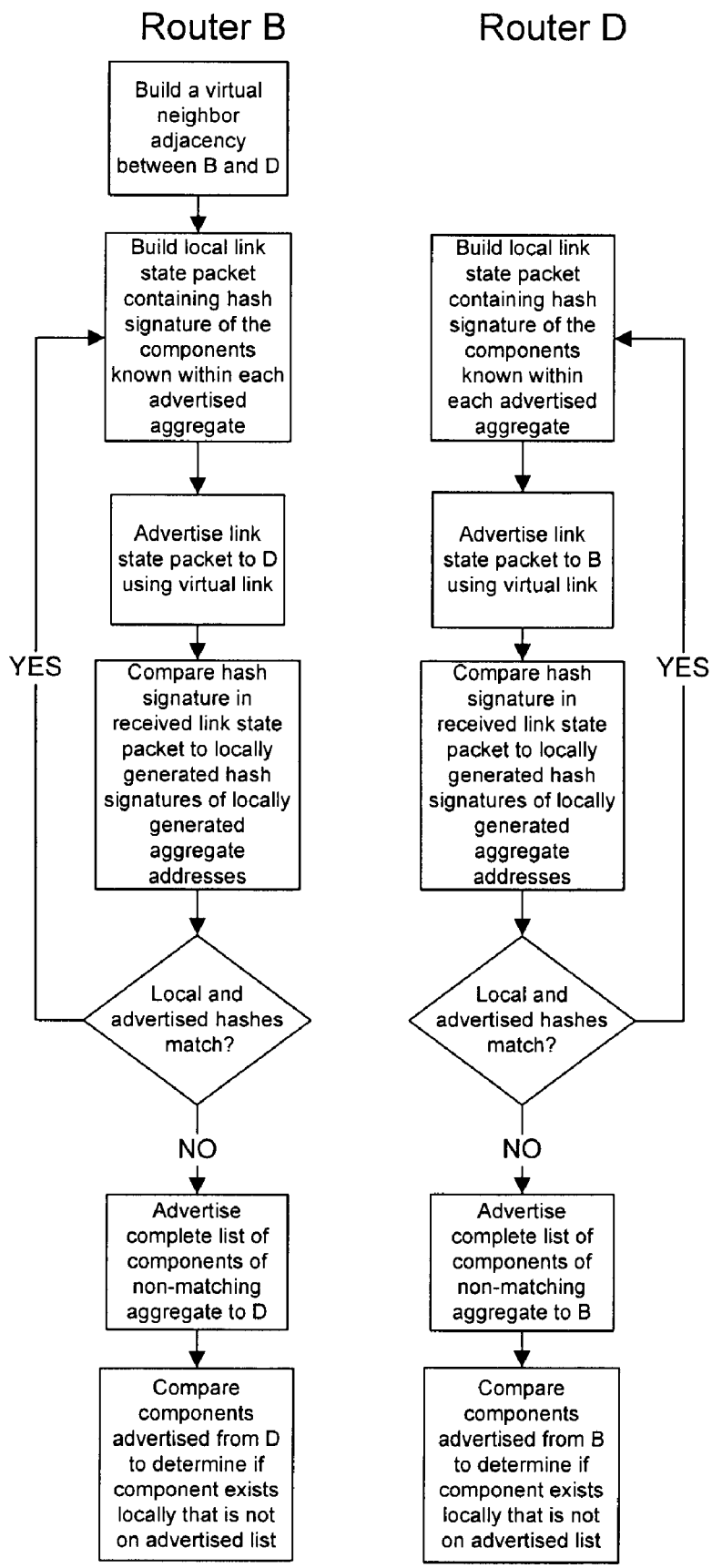
FIG. 2 illustrates the operation of a first example embodiment.

An example embodiment will now be described with reference to the flow chart of FIG. 2. The procedure described allows the aggregating routers to share the components of the aggregate addresses advertised by each router. The following description will refer to the aggregating routers B and D of FIG. 1 for purposes of illustration. However, the technique described in FIG. 2 is generally applicable to any network having two or more aggregating routers.

A "virtual" link neighbor adjacency is built between Routers B and D. In the context of routers, the term "neighbors" means two routers sharing a common link. When two routers have discovered each other as neighbors they go through a process of agreeing on protocol-specific parameters to build an adjacency. In FIG. 1 the aggregating Routers B and D do not share a common link and are therefore not neighbors. Accordingly, the "virtual" neighbor adjacency allows Routers B and D to compare their data bases. In the example of FIG. 1, the virtual link would be configured through the transit area consisting of Router A.

Each router builds a hash signature of the components of each aggregated address in the router's data base. A hash function is utilized that is unique and deterministic so that the same set of components will always generate the same hash signature. The router includes the hash signature of the address components of each of its aggregate addresses in a link state packet.

In the example of FIG. 1, Router C advertises destination addresses 10.2.1.1/24 and 10.2.1.2/24 which are entered into the route table of Router B and aggregated by router B into an aggregate address having a value of 10.0.0.0/8. The aggregate address is then advertised by Router B to Router A via the link B:A. Router E advertises destination addresses 10.1.1.0/24 and 10.1.2.0/24 which are entered into the route table of Router D and aggregated by Router D into an aggregate address having a value of 10.0.0.0/8. The aggregate address is then advertised by Router D to Router A via the link D:A. In this example Routers B and D have aggregated different sets of component addresses into the same aggregate address value.

Accordingly, Router B hashes the addresses 10.2.1.1/24 and 10.2.1.2/24 into a B hash value associated with the aggregate address 10.0.0.0/8 and inserts the B hash value and aggregate address into a link state packet. Similarly, Router D hashes the addresses 10.1.1.0/24 and 10.1.2.0/24 into a D hash value associated with the aggregate address 10.0.0.0/8 and inserts the D hash value and aggregate address into a link state packet.

In this example, in OSPF the link state packet is a type 9 Opaque LSA (link-local scope) packet. Opaque packets include application-specific information that can be used by other routers.

The link state packets are advertised between Routers B and D on the virtual link. When Router B receives the link state packet from Router D it compares the D hash signature generated by Router D to a locally generated B hash signature of its local address components of the aggregate address. If the received and locally generated hash signatures match then the list of components is identical in Routers D and B because only the same list of components could be hashed to the same hash signature.

Since a hash signature has significantly fewer bits than the number of bits expressing the component addresses, bandwidth is saved by exchanging the hash signatures instead of the exchanging the complete list of components between aggregating routers. The aggregating routers need to take further action only if the hash signatures do not match. Further, in this embodiment the amount of information exchanged between aggregating routers to a minimum, and routers other than the aggregating routers are not required to maintain state or information about available aggregates If, as in the example illustrated in FIG. 1 and described above, the hash signatures for a particular aggregate address do not match then Routers B and D advertise the complete list of the components for that aggregate address to each other over the virtual link. Routers B and D can then compare the received component list to determine which components exist locally that are not on the received component list.

Another example embodiment will now be described with reference to the flow chart of FIG. 3. A router that receives a list of component addresses for an aggregate address compares this list to a list of locally available components falling within the same aggregate. In the example of FIG. 1, at Router B, the list advertised by Router D will be compared to the locally available list of address components for the aggregate address having the value of 10.0.0.0/8.

In this example, Router B discovers that its local component addresses 10.2.1.1/24 and 10.2.1.2/24 are not included in Router D's component address list for the aggregate address having the value 10.0.0.0/8.

Router B then "leaks", i.e., advertises the component addresses 10.2.1.1/24 and 10.2.1.2/24 and the aggregate address 10.0.0.0/8 to the rest of the network (Router A in this example). Now Router A includes entries for destination addresses 10.2.1.1/24 and 10.2.1.2/24 in its route table pointing to Router B.

The processes described above with reference to FIGS. 2 and 3 solve both the black hole and sub-optimal routing problems described above.

Figures 3, 4, 5:
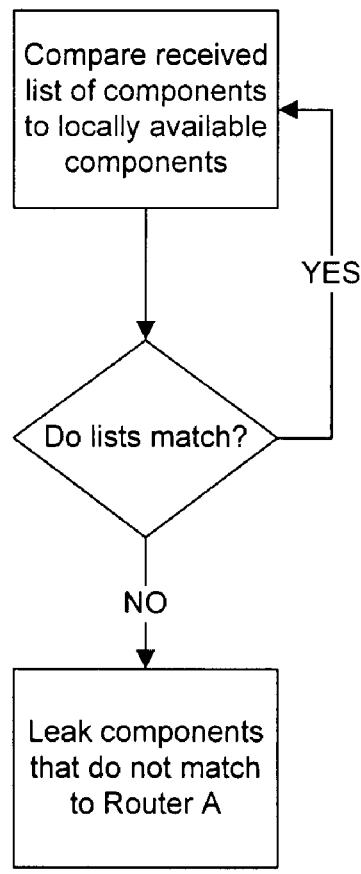
FIG. 3 illustrates the operation of a second example embodiment.
FIGS. 4 and 5 illustrate example route tables.

Turning first to the black hole problem, FIG. 4 depicts the Route tables of Routers A, B, and D prior to application of the steps recited above. In the route table of Router A the entry for address 10.0.0.0/8 has a pointer to link A:D. If a packet is received at Router A having destination address 10.2.1.1/24 it will be matched to address 10.0.0.0/8 according to the longest prefix rule. In this case the packet will be routed to Router D. The route table of Router D, in this example, does not include an entry for 10.2.1.1/24 and the packet will be dropped thereby creating a black hole.

FIG. 5 depicts the route table of Router A after Router B leaks component address of aggregate address that are not included in route table of Router D. In this case, the route table of Router A now includes an entry for the address 10.2.1.1/24 with a pointer to link A:B so the packet is matched to the address 10.2.1.1/24 according to the longest prefix rule and forwarded to Router B thereby obviating the black hole problem.

Also, for the route table of FIG. 5, if the link C:D is down the packets received at router A will be routed optimally on link A:B.

If a router is auto-aggregating routing information, it may use the routes advertised by a neighboring aggregating router to determine if specific parts of the address space are reachable, and will be advertised in longer prefix advertisements. This information can be used to determine which aggregates it is safe to automatically advertise or not.

Figure 6:
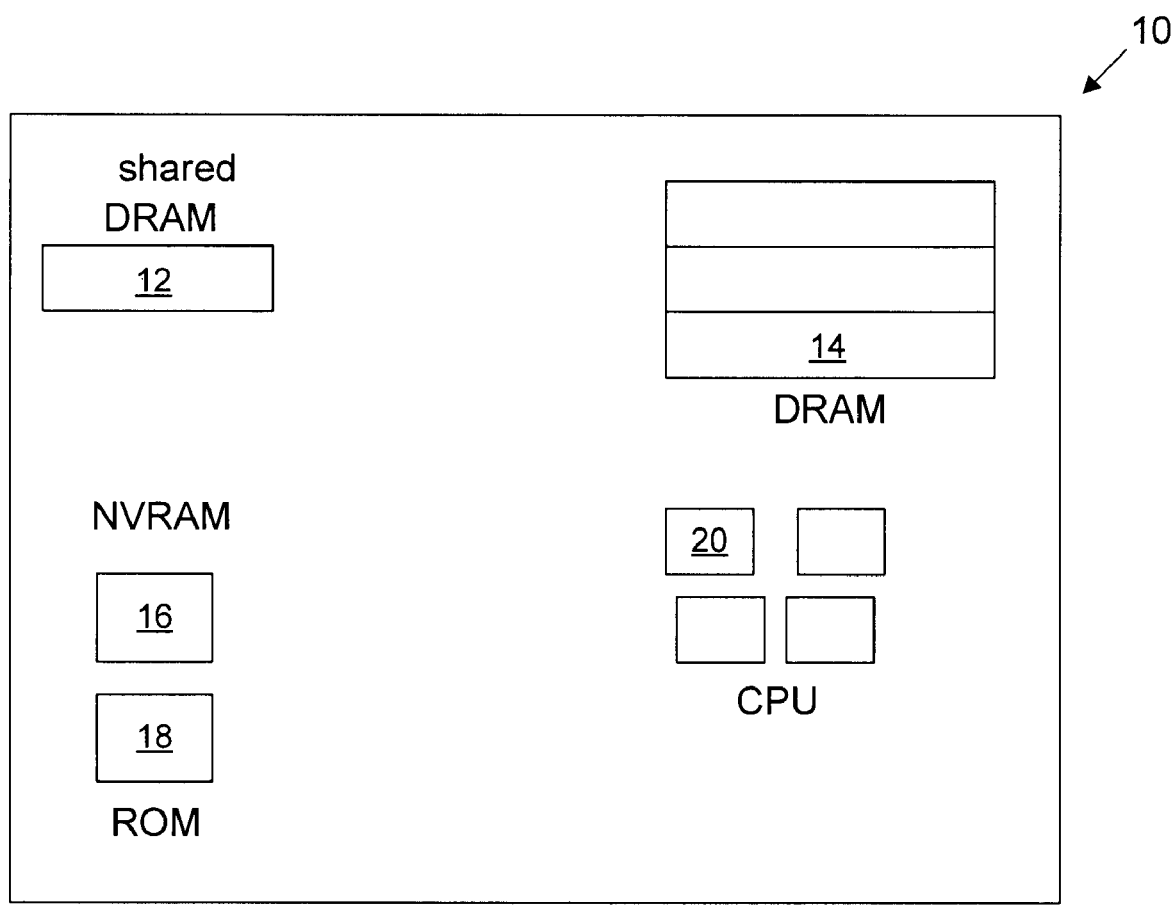
FIG. 6 illustrates hardware suitable for implementing an example embodiment.

FIG. 6 depicts an example of a network device including a motherboard 10 having non-transitory shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the network device's packet buffer. The NVRAM (non-volatile RAM) is used to store the network device's configuration file and also includes flash memory for storing an image of the operating system. The ROM 18 holds a boot-start program which holds a minimum configuration state needed to start the network device. Alternatively, other configurations of the motherboard can be used. For example, the motherboard may not have separate ROM or NVRAM and the configuration file and operating system image may be stored and executed out of flash memory.

In an example embodiment, the route protocol code in the operating system can be modified to perform the steps described above. Alternatively, some of the functions could be performed by the execution of computer readable code and other steps implemented by hard-wired logic.

Alternatives and substitutions will now be apparent to persons of skill in the art. In particular, the above example embodiments have described in the context of the OSPF routing protocol. However, as is understood by persons of ordinary skill that the techniques described above are equally applicable to other routing protocols such as EIGRP (Enhanced Interior Gateway Routing Protocol), BGP (Border Gateway Protocol), RIP (Routing Information Protocol) etc. Accordingly, it is not intended to limit the invention except as provided by the appended claims.

What is claimed is:

1. A method, performed by a processing unit on a first aggregating router included in a network, comprising:
    hashing a first group of component addresses to form a first hash signature, where the first group of component addresses are summarized as a first aggregate address;
    inserting the first aggregate address and the first hash signature into a link state packet
    comparing a second hash signature received at the first aggregating router to the first hash signature, with the second hash signature summarizing a second group of component addresses hashed at a second aggregating router, where the second group of component addresses have been summarized, at the second aggregating router, into an aggregate address which is the same as the first aggregate address; and
    advertising a list of the first group of component addresses to the network if the first hash signature does not match the second hash signature.

2. The method of claim 1 where the step of inserting the first aggregate address and the first hash signature into a link state packet comprises:
    building an OSPF type 9 Opaque LSA packet.

3. The method of claim 1 where the step of advertising comprises:
    building a virtual neighbor link with the second aggregating router.

4. An apparatus comprising:
    a memory, included in a first aggregating router, with the memory holding program code and route information including a first group of component addresses and a first aggregate address that summarizes the first group of component addresses; and
    a processor, included in the first aggregating router, configured to execute program code to hash the component addresses to form a first hash signature, to insert the first hash signature and first aggregate address into a link state packet to compare a second hash signature received at the first aggregating router to the first hash signature, with the second hash signature summarizing a second group of component addresses hashed at a second aggregating router, where the second group of component addresses have been summarized as the first aggregate address at the second aggregating router, and to advertise a list of the first group of component addresses to the network if the first hash signature does not match the second hash signature.

5. The apparatus of claim 4 where the processor is further configured to execute program code to:
    build an OSPF type 9 Opaque LSA packet into which the first hash signature and first aggregate address are inserted.

6. The apparatus of claim 4 where the processor is further configured to execute program code to:
    build a virtual neighbor link with the second aggregating router.

7. One or more non-transitory computer readable storage media with an executable program stored thereon, wherein the program instructs a processing unit to perform the following steps:
    hashing a first group of component addresses at a first aggregating router included in a network to form a first hash signature, where the first group of component addresses are summarized as a first aggregate address;
    inserting the first aggregate address and the first hash signature into a link state packet;
    comparing a second hash signature received at the first aggregating router to the first hash signature, with the second hash signature summarizing a second group of component addresses hashed at a second aggregating router, where the second group of component addresses have been summarized, at the second aggregating router, into an aggregate address which is the same as the first aggregate address; and
    advertising a list of the first group of component addresses to the network if the first hash signature does not match the second hash signature.

8. The one or more computer readable storage media of claim 7 wherein the program further instructs the processing unit to perform the following steps:
    build an OSPF type 9 Opaque LSA packet.

9. The one or more computer readable storage media of claim 7 wherein the program further instructs the processing unit to perform the following steps:
    building a virtual link neighbor link with the second aggregating router.

* * * * *